United States Patent

[11] 3,596,370

[72] Inventor Sami I. Gabrail
Syracuse, N.Y.
[21] Appl. No. 884,164
[22] Filed Dec. 11, 1969
[45] Patented Aug. 3, 1971
[73] Assignee General Electric Company

[54] THIN FILM CAPACITOR
6 Claims, 7 Drawing Figs.

[52] U.S. Cl. .......... 317/230, 317/238, 317/258
[51] Int. Cl. .......... H01g 3/07
[50] Field of Search .......... 317/230, 231, 232, 233, 238, 258

[56] References Cited
UNITED STATES PATENTS

| | | | |
|---|---|---|---|
| 3,201,667 | 8/1965 | Varga | 317/258 |
| 3,273,033 | 9/1966 | Rossmeisl | 317/258 |
| 3,359,468 | 12/1967 | Patterson et al. | 317/258 |
| 3,365,626 | 1/1968 | Mohler et al. | 317/230 |
| 3,523,221 | 8/1970 | Tierman et al. | 317/230 |

*Primary Examiner*—James D. Kallam
*Attorneys* —Robert J. Mooney, Nathan J. Cornfeld, Frank L. Neuhauser, Oscar B. Waddell and Joseph B. Forman

ABSTRACT: This invention relates to an improved thin film capacitor structure and a method for making the same. The thin film capacitor comprises two layers of aluminum separated by a dielectric layer. Interposed between one of the aluminum layers and the dielectric layer is a barrier layer which prevents the various mentioned layers from alloying together in the temperature range of 400° to 600° C.

INVENTOR:
SAMI I. GABRAIL,

BY Robert J. Mooney
HIS ATTORNEY.

THIN FILM CAPACITOR

This invention relates to an improved thin film capacitor structure and a method for making the same. More particularly it relates to a thin film capacitor structure suitable for incorporation in monolithic integrated circuit devices.

In the semiconductor prior art thin film capacitors have been devised which are particularly suited for use in the fabrication of monolithic semiconductor integrated circuit and hybrid semiconductor devices. One type of thin film capacitor which is particularly suited for incorporation in monolithic semiconductor integrated circuits comprises a pair of aluminum layers which constitute the plates or electrodes of the capacitor and a dielectric layer of silicon monoxide which separates the two aluminum layers from each other. In fabrication of this type of thin film capacitor it is customary to expose this structure to temperatures in the range of 400° to 600° C. The use of these high temperatures is necessary to enhance the adhesion of the various layers of the capacitor to each other as well as to any semiconductor passivating layer they may be attached to. Unfortunately, at these temperatures, i.e. 400° to 600° C., the silicon monoxide dielectric layer is susceptible to the formation of cracks due to its porous construction. This limitation frequently results in one of the aluminum layers filling these cracks and spiking through the dielectric layer to the other aluminum layer thereby electrically short circuiting the capacitor by forming a conductive path between the electrodes.

The probability of such an occurrence increases with temperature and presents an acute problem in the temperature range between 400° to 600° C. because aluminum and silicon form a eutectic structure at 577° C., and the present fabrication techniques known to those skilled in the art require the use of temperatures in this range. For example, when the thin film capacitor is formed on a passivating layer of silicon dioxide which covers a semiconductor device, after the initial layer of aluminum is deposited and defined on the silicon dioxide layer it is subsequently given a sintering heat treatment around 500° C. to enhance the adhesion of the aluminum to silicon dioxide.

It is, therefore, an object of this invention to provide an improved thin film capacitor which is capable of withstanding temperatures in the range of 400° to 600° C. without suffering electrically short circuits between the electrodes of the capacitor.

It is another object of this invention to provide a method of making a thin film capacitor of the foregoing character which is compatible with present thin film capacitor fabrication techniques thereby minimizing the cost of obtaining the benefits of such a thin film capacitor.

Figure 1:
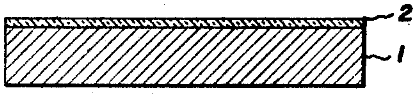
Figure 3:
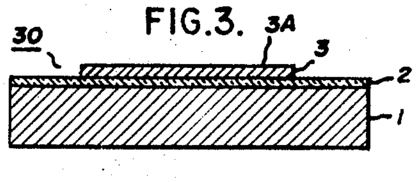
Figure 2:
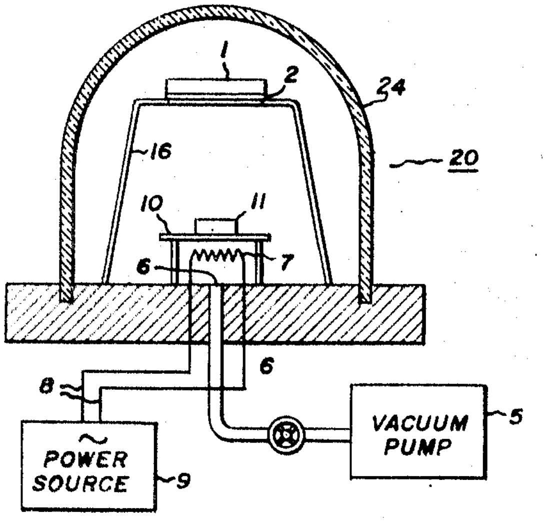
Figure 4:
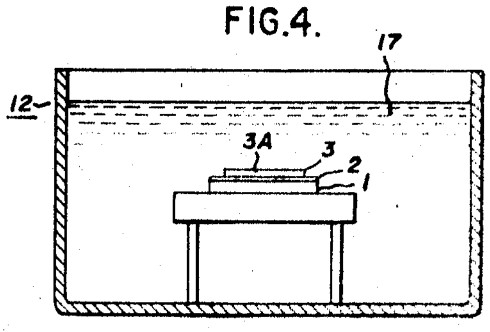
Figure 5:
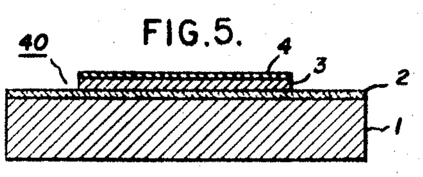
Figure 6:
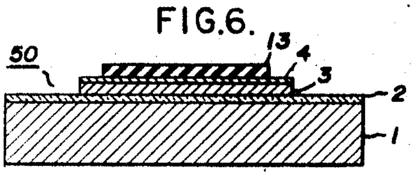
Figure 7:
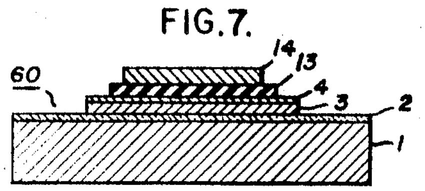

These and other objects of this invention will be apparent from the following description and the accompanying drawings wherein:

FIG. 1 is a cross-sectional view of a silicon pellet including a silicon dioxide layer prior to the formation of a thin film capacitor, FIG. 2 is a cross-sectional view of an evaporation chamber suitable for evaporating an aluminum layer on the silicon pellet shown in FIG. 1, FIG. 3 is a cross-sectional view of the silicon pellet of FIG. 1 after the aluminum layer has been deposited thereon, FIG. 4 is a cross-sectional view of an anodizing bath suitable for forming an oxide layer on the aluminum layer shown in FIG. 3, FIG. 5 is a cross-sectional view of the silicon pellet and aluminum layer shown in FIG. 3 including an aluminum oxide layer formed in the anodizing bath on the top surface of the aluminum layer, FIG. 6 is a cross-sectional view of the structure shown in FIG. 5 with the addition of a layer of silicon monoxide dielectric material, and FIG. 7 is a cross-sectional view of the completed improved thin film capacitor structure formed according to the present invention.

Briefly, my invention relates to an improved thin film capacitor comprising a pair of aluminum electrodes separated from one another by a silicon monoxide dielectric layer and which further includes a barrier layer of an aluminum oxide compound interposed between at least one of the aluminum layers and the silicon monoxide layer. The barrier layer gives the capacitor the ability of withstanding temperatures in the range of 400° to 600° C. without suffering deleterious effects such as an electrical short circuit between the aluminum electrodes.

Referring to FIG. 1, a semiconductor pellet or substrate 1 which may comprise monocrystalline silicon is shown having on one face an insulating layer or cover 2 of silicon dioxide. The silicon dioxide cover 2 can have a thickness of, for example, about 5,000 to 25,000 angstroms, and is formed by conventional techniques well known to those skilled in the art and forming no part of the present invention.

FIG. 2 is a cross-sectional view of a vacuum deposition apparatus 20 which is particularly suitable for evaporating an aluminum layer over the silicon dioxide layer 2 shown in FIG. 1. Aluminum is preferred to other types of conductive materials because of its ability to form a good contact with silicon dioxide. This apparatus 20 includes a vacuum chamber 24 in which a vacuum is maintained by means of a vacuum pump 5 and a vacuum intake conduit 6. An electrical heating coil 7 is connected via a pair of electrical leads 8 to a source of electrical power 9. The heating coil 7 is positioned adjacent a platform 10 on which is placed pure aluminum metal 11. The silicon substrate 1 with its layer of silicon dioxide 2 is placed face down near the upper portion of the vacuum chamber 4 and is held in place by a holder 16 so that as the aluminum metal 11 evaporates due to the heating action of the heating coil 7, and the rising aluminum atoms come in contact with the silicon dioxide layer 2 they are sufficiently displaced from the source of heat 7 so that they condense back into solid aluminum metal thereby forming a film of predetermined thickness on the silicon dioxide layer 2. Preferably the thickness of aluminum is about 10,000 A.

Once the aluminum layer is deposited on the silicon dioxide layer 2 a photoresist masking and etching process well known in the art is used to define the size and shape of the aluminum layer. FIG. 3 shows the aluminum layer 3 upon completion of the masking and etching fabrication steps. It is, of course, recognized that portions of aluminum layer 3 may also be used as contact pads and interconnects in other areas of the silicon pellet not shown in FIG. 3. In addition, other techniques such as electron beam deposition, sputtering, etc. may also be used to deposit the aluminum without affecting the teaching of my invention. The entire silicon pellet may also be subsequently alloyed or sintered to form a better bond between the silicon and aluminum (silicon and aluminum form a eutectic at 577° C.). However, this effect is limited in the thin film capacitor portion of the pellet 1 by the silicon dioxide layer 2. Again, this technique of forming the aluminum layer is not part of my invention and therefore no further description of it is deemed necessary.

In accordance with the present invention a barrier layer 4 is formed on the exposed face of aluminum layer 3. This barrier layer 4 consists essentially of aluminum oxide having a sufficient thickness to prevent the alloying, or other deleterious chemical reaction of aluminum layer 3 with a subsequently deposited silicon oxide dielectric layer. Preferably, according to the present invention the thickness of the barrier layer 4 is in the range of 1,000 to 3,000 angstroms.

FIG. 4 shows an anodizing apparatus 12 which is particularly suitable for the fabrication of the barrier layer in a preferred embodiment of my invention. An anodizing bath 17 contained in apparatus 12 consists of a solution of sodium carbonate ($Na_2CO_3$) and sodium dichromate ($Na_2Cr_2O_7$). The preferred percentages of the sodium carbonate and sodium dichromate in the bath 17 are 3 percent and 5 percent respectively. The temperature of the liquid bath 17 partially determines the rate at which the anodizing reaction takes place and 65° has been found to yield optimum results in a preferred embodiment.

The sodium carbonate reacts with the aluminum to form aluminum oxide ($Al_2O_3$). Since aluminum oxide, like aluminum, is also soluble in the sodium carbonate, the sodium dichromate is added to the bath to stabilize the aluminum oxide by forming aluminum chromate ($Al_2(CrO_4)_3$) compound. Aluminum chromate is insoluble in sodium carbonate and, therefore, provides a very stable barrier material. In order to control the rate of growth and porosity of the aluminum oxide layer the percentage of sodium carbonate is kept at a maximum of 3 percent, otherwise a very porous inferior aluminum chromate compound is produced.

In addition, sodium carbonate is used because once the sodium dichromate reacts with the initial aluminum oxide present on the aluminum surface, due to normal exposure to air during handling, to form aluminum chromate, it has the ability to penetrate through the aluminum chromate layer initially formed thereby forming new aluminum oxide which in turn is converted to aluminum chromate. The main advantage of forming the aluminum oxide compound in this manner is that it is a relatively cheap and easy method of fabrication as compared to other techniques available. However, it will be understood that the practice and advantages of the invention are not dependent upon any particular theory selected to explain the improved results thus attained.

There are other ways in which the aluminum oxide compound layer 4 may be formed; by purely mechanical techniques or by an electrolysis bath containing oxygen atoms. In this latter reaction, an electric current flowing between the aluminum plate as an anode and a conveniently displaced cathode causes the oxygen in the liquid to combine with the pure aluminum atoms to form aluminum oxide. A limitation of this process, which is not present in the preferred process described above, is that in the electrolysis process the thickness of the aluminum oxide layer is determined by the electric energy. Since the aluminum oxide layer is a nonconductor, at some time during the process the current flowing between the cathode and the aluminum anode will be effectively blocked. In some applications where an extremely thick aluminum oxide layer is desired, the abrupt halt in the anodizing process caused by the blockage of current is extremely undesirable. While the entirely chemical reaction described with reference to FIG. 4 has been found to be preferred in the best mode of applicant's invention, the invention is not to be limited thereto but should comprehend any and all methods of anodizing the aluminum layer.

Referring now to FIG. 5 the composite structure 40 is shown including the silicon wafer 1, the aluminum layer 3, and the aluminum oxide layer 4 formed by an anodizing process.

The next step in the process of forming the thin film capacitor according to applicant's invention is to deposit a silicon monoxide dielectric layer 13 of between 1,000 and 5,000 angstroms thickness on the aluminum oxide layer 4. The evaporating technique described with respect to FIG. 2 may also be used in depositing the silicon monoxide dielectric layer. The temperatures encountered in evaporating silicon monoxide are upwards of 400° C., which temperatures are sufficient to cause alloying between aluminum and silicon atoms. However, by means of the interposed aluminum oxide compound layer 4, which layer is relatively stable with high temperatures, alloying between the aluminum layer 3 and the silicon monoxide dielectric layer is prevented. The structure 50 thus formed including the silicon monoxide dielectric layer 13 is illustrated in FIG. 6.

Referring now to FIG. 7 the structure 50 of FIG. 6 is shown with an additional conductive top layer 14 formed on the top surface of the silicon monoxide dielectric layer 13 thus providing a device 60. Preferably, the conductive layer 14 is aluminum because of its ability to form a good contact with the silicon monoxide. Other conductive materials which may also be used include titanium, copper, nickel, and tantalum. The evaporating technique described with respect to FIG. 2 may also be used in applying the aluminum layer 14. It will be noted that there is no need for any protection against alloying between the aluminum in the top layer 14 and silicon atoms in the dielectric layer 13 because no matter how much alloying takes place at this upper junction, no short circuit can develop between the top and bottom aluminum plates because of the aluminum oxide layer 4 at the lower junction. Thus, only one aluminum oxide layer is needed in applicant's thin film capacitor; however, should further precaution against faulty capacitors be required a second layer could be used between the top layer 14 and the dielectric layer 13.

In addition to the primary object of preventing electrical short circuits in thin film capacitors due to alloying at high temperatures, the aluminum oxide compound layer 4 can also be used to raise the breakdown voltage level between the upper and lower plates of the two aluminum layers to a desired value. The breakdown voltage of the capacitor is determined by the thickness of both insulating layers. Furthermore, by maintaining the cross-sectional area of the bottom electrode and barrier layer larger than the cross-sectional area of both the dielectric layer and the top electrode and wherein the cross-sectional area of the dielectric layer is larger than the cross-sectional area of the top electrode the possibility of producing an electrical short circuit is further reduced because any alloying along the edges of the various layers and electrodes is avoided by spacing them apart from each other.

Although I have described my invention in a particular embodiment, the principle underlying the invention will suggest many modifications of this embodiment to those skilled in the art. Therefore, it is desired that the appended claims not be limited to the described embodiment but rather should encompass all such modifications as fall within the spirit and scope of this invention.

What I claim as new and desire to secure by Letters Patent of the United States is:

1. A thin film capacitor comprising:
A first electrode layer of aluminum,
a second electrode layer of conductive material in spaced relationship with said first electrode layer,
a first layer of dielectric material between said first and second electrode layers,
said first dielectric layer including components alloyable with one of said first and second electrode layers above 400° C.,
a barrier layer of aluminum oxide material interposed between said first layer of dielectric material and said one electrode layer,
whereby said barrier layer prevents said first layer of dielectric material from deleteriously alloying with said one electrode layer.

2. A thin film capacitor as defined in claim 1 wherein said barrier layer is aluminum chromate, said first dielectric layer is silicon monoxide and said second electrode layer consists of one or more metals from the group including aluminum, copper, nickel, and tantalum.

3. A thin film capacitor as defined in claim 1 wherein said first and second electrode layers are about 10,000 angstroms thick, said first dielectric layer is between 1,000 and 5,000 angstroms thick and the barrier layer is between 1,000 and 3,000 angstroms thick.

4. A thin film capacitor formed on a silicon dioxide layer covering a silicon substrate comprising:
a first electrode layer of aluminum contiguous with the silicon dioxide layer;
a second electrode layer of aluminum in spaced relationship with said first layer;
a first dielectric layer of silicon monoxide between said first and said second electrode layers; and
a barrier layer of aluminum oxide compound contiguous with said first dielectric layer and at least one of said first or second electrode layers, whereby said barrier layer prevents said first dielectric layer from deleteriously alloying with said one electrode layer.

5. A thin film capacitor as defined in claim 4 wherein said first electrode layer and said barrier layer have the same cross-sectional area, said first dielectric layer has a larger cross-sectional area than said second electrode layer but a smaller cross-sectional area than said first electrode layer and said barrier layer.

6. A thin film capacitor as defined in claim 4 wherein said barrier layer is aluminum chromate.